United States Patent
Srinivasa et al.

(10) Patent No.: US 9,936,053 B2
(45) Date of Patent: **\*Apr. 3, 2018**

(54) ENCODING PARAMETERS FOR A WIRELESS COMMUNICATION SYSTEM

(71) Applicant: Marvell World Trade Ltd., St. Michael (BB)

(72) Inventors: Sudhir Srinivasa, Campbell, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 81 days.

This patent is subject to a terminal disclaimer.

(21) Appl. No.: 15/043,237

(22) Filed: Feb. 12, 2016

(65) Prior Publication Data

US 2016/0165016 A1    Jun. 9, 2016

Related U.S. Application Data

(63) Continuation of application No. 13/957,309, filed on Aug. 1, 2013, now Pat. No. 9,264,287, which is a
(Continued)

(51) Int. Cl.
*H04J 3/24* (2006.01)
*H04L 29/06* (2006.01)
(Continued)

(52) U.S. Cl.
CPC .............. *H04L 69/22* (2013.01); *H04L 1/007* (2013.01); *H04L 1/0056* (2013.01);
(Continued)

(58) Field of Classification Search
CPC ..... H04L 69/22; H04L 1/0056; H04L 1/0068; H04L 1/007; H04L 1/0625
(Continued)

(56) References Cited

U.S. PATENT DOCUMENTS 6,895,544 B1   5/2005 Park et al.
8,665,949 B1   3/2014 Zhang et al.
(Continued)

FOREIGN PATENT DOCUMENTS

| CN | 1320865 A | 11/2001 |
|---|---|---|
| CN | 102474386 A | 5/2012 |
| WO | WO-2011/014685 A2 | 2/2011 |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).
(Continued)

*Primary Examiner* — Faisal Choudhury

(57) ABSTRACT

In a method for generating a physical layer (PHY) data unit for transmission via a communication channel, information bits to be included in the PHY data unit are received. A number of padding bits are added to the information bits. The number of padding bits is determined based on respective virtual values of each of one or more encoding parameters. The information bits are parsed to a number of encoders and are encoded, using the number of encoders, to generate coded bits. The coded bits are padded such that padded coded bits correspond to respective true values of each of the one or more encoding parameters. The PHY data unit is generated to include the padded coded bits.

22 Claims, 17 Drawing Sheets

Related U.S. Application Data continuation-in-part of application No. 13/246,577, filed on Sep. 27, 2011, now Pat. No. 8,873,652.

(60) Provisional application No. 61/678,531, filed on Aug. 1, 2012, provisional application No. 61/390,971, filed on Oct. 7, 2010.

(51) Int. Cl.

| | | |
|---|---|---|
| *H04L 5/00* | (2006.01) | |
| *H04L 27/00* | (2006.01) | |
| *H04L 1/06* | (2006.01) | |
| *H04W 28/18* | (2009.01) | |
| *H04W 84/12* | (2009.01) | |
| *H04L 1/00* | (2006.01) | |

(52) U.S. Cl.
CPC ............. *H04L 1/0625* (2013.01); *H04L 5/00* (2013.01); *H04L 27/00* (2013.01); *H04L 29/0653* (2013.01); *H04L 1/0057* (2013.01); *H04L 1/0059* (2013.01); *H04L 1/0068* (2013.01); *H04W 28/18* (2013.01); *H04W 84/12* (2013.01)

(58) Field of Classification Search
USPC ........................................................ 370/474
See application file for complete search history.

(56) References Cited

U.S. PATENT DOCUMENTS

| | | | |
|---|---|---|---|
| 8,724,720 B2 | 5/2014 | Srinivasa et al. | |
| 8,873,652 B2 | 10/2014 | Srinivasa et al. | |
| 9,178,651 B2 | 11/2015 | Srinivasa et al. | |
| 9,264,287 B2 | 2/2016 | Srinivasa et al. | |
| 2007/0101229 A1 | 5/2007 | Niu et al. | |
| 2008/0225818 A1* | 9/2008 | Niu .................. | H03M 13/15 370/342 |
| 2008/0225819 A1* | 9/2008 | Niu .................. | H03M 13/05 370/342 |
| 2009/0196163 A1 | 8/2009 | Du | |
| 2011/0026623 A1 | 2/2011 | Srinivasa et al. | |
| 2011/0116470 A1* | 5/2011 | Arora ............... | H04W 36/0016 370/331 |
| 2011/0188518 A1* | 8/2011 | Kenney ............ | H04L 1/0041 370/476 |

OTHER PUBLICATIONS

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE P802.11n™ D3.00, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Ardiansyah et al., "An ASIC Implementation of Puncture and Spatial Stream Parser for MIMO Wireless LAN System," 2011 2nd INternational Conference on Instrumentation, Communications, Information Technology and Biomedical Engineering, Bandung Indonesia, 5 pages (Nov. 2011).

(56) References Cited

OTHER PUBLICATIONS

Chen, "Home Network Basis: Transmission Environments and Wired/Wireless Protocols," Prentice Hall, pp. 1-26 (Jul. 2003).
Hiertz et al., "The IEEE 802.11 Universe," IEEE Communications Magazine, pp. 62-70, (Jan. 2010).
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
van Nee et al. "The 802.11n MIMO-OFDM Standard for Wireless LAN and Beyond," Wireless Personal Communications, vol. 37, pp. 445-453 (Jun. 2006).
International Search Report and Written Opinion in International Application No. PCT/US2013/053277, dated Oct. 18, 2013 (10 pages).
International Preliminary Report on Patentability in International Application No. PCT/US2013/053277, dated Feb. 12, 2015 (8 pages).
U.S. Appl. No. 61/387,915, Srinivasa et al., "Stream Parsing for 160 MHz 11 ac," filed Sep. 29, 2010.
U.S. Appl. No. 61/387,919, Zhang et al., "160 MHz Stream Parser," filed Sep. 29, 2010.
First Office Action in Chinese Patent Application No. 2013800494749, dated May 26, 2017, with English translation (11 pages).
Search Report in Chinese Patent Application No. 2013800494749, dated May 26, 2017 (2 pages).
Communication pursuant to Article 94(3) EPC in European Patent Application No. 13750214.2, dated Oct. 20, 2017 (6 pages).
Notification of Reasons for Refusal in Japanese Patent Application No. 2015-525603, dated Jul. 24, 2017, with English translation (6 pages).
Office Action in Chinese Patent Application No. 201380049474.9, dated Oct. 30, 2017, with English translation (14 pages).

* cited by examiner

| MCS | Modulation | Coding Rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 7/8 |

FIG. 3

| A₀ | A₁ | A₂ | A₃ | A₄ |
|----|----|----|----|----|
| B₀ | B₁ | B₂ | B₃ | B₄ |

FIG. 4A

| # Punctured bits in the last block in the last OFDM symbol (x) | # Coded bits required to generate x bits post-puncturing (g(x, R)) | # Uncoded bits required to generate x bits post-puncturing (f(x, R)) |
|---|---|---|
| 1 | N.A. | N.A. |
| 2 | 2 | 1 |
| 3 | 4 | 2 |
| 4 | 6 | 3 |
| 5 | 8 | 4 |
| 6 | 10 | 5 |

FIG. 4B

| A₀ | A₁ | A₂ |
|---|---|---|
| B₀ | B₁ | B₂ |

*FIG. 5A*

| # Punctured bits in the last block in the last OFDM symbol (x) | # Coded bits required to generate x bits post-puncturing (g(x, R)) | # Uncoded bits required to generate x bits post-puncturing (f(x, R)) |
|---|---|---|
| 1 | N.A. | N.A. |
| 2 | 2 | 1 |
| 3 | 4 | 2 |
| 4 | 6 | 3 |

| # Punctured bits in the last block in the last OFDM symbol (x) | # Coded bits required to generate x bits post-puncturing (g(x, R)) | # Uncoded bits required to generate x bits post-puncturing (f(x, R)) |
|---|---|---|
| 1 | N.A. | N.A. |
| 2 | 2 | 1 |
| 3 | 4 | 2 |

| Encoder 1 | $[\text{floor}(B/N_{ES}) + 1]N_R$ bits |
|---|---|
| Encoder 2 | $[\text{floor}(B/N_{ES}) + 1]N_R$ bits |
| Encoder $(\text{mod}(B, N_{ES}))$ | $[\text{floor}(B/N_{ES}) + 1]N_R$ bits |
| Encoder $(\text{mod}(B, N_{ES}) + 1)$ | $[\text{floor}(B/N_{ES})]N_R + f(N_{residue}, R)$ bits |
| Encoder $N_{ES}$ | $[\text{floor}(B/N_{ES})]N_R$ bits |

FIG. 8

| | | | | | | | | |
|---|---|---|---|---|---|---|---|---|
| Encoder 1 | | 1 | $N_{ES}+1$ | $2N_{ES}+1$ | ... | ... | | |
| Encoder 2 | | 2 | $N_{ES}+2$ | $2N_{ES}+2$ | ... | ... | | |
| Encoder (mod(B, $N_{ES}$)) | | ... | ... | ... | ... | ... | | |
| Encoder (mod(B, $N_{ES}$)+1) | | k | $N_{ES}+k$ | ... | ... | B | | |
| | | k+1 | $N_{ES}+k+1$ | ... | ... | $f(N_{residue}, R)$ | | |
| Encoder $N_{ES}$ | | $N_{ES}$ | $2N_{ES}$ | ... | ... | | | |

FIG. 10

| Encoder 1 | $[\text{floor}(B/N_{ES})]N_R + f(x_1, R) + f(x_2, R) + \ldots f(x_{n-1}, R) + f(x_n, R)$ bits |
|---|---|
| Encoder 2 | $[\text{floor}(B/N_{ES})]N_R + f(x_1, R) + f(x_2, R) + \ldots f(x_{n-1}, R) + f(x_n, R)$ bits |
| Encoder k | $[\text{floor}(B/N_{ES})]N_R + f(x_1, R) + f(x_2, R) + \ldots f(x_{n-1}, R)$ bits |
| Encoder $N_{ES}$ | $[\text{floor}(B/N_{ES})]N_R + f(x_1, R) + f(x_2, R) + \ldots f(x_{n-1}, R)$ bits |

*FIG. 11*

| Encoder 1 | [floor(B/N_ES) + 1]N_R bits |
|---|---|
| Encoder 2 | [floor(B/N_ES) + 1]N_R bits |
| ... | ... |
| Encoder (mod(B, N_ES)) | [floor(B/N_ES) + 1]N_R bits |
| Encoder (mod(B, N_ES) + 1) | [floor(B/N_ES)]N_R bits |
| ... | ... |
| Encoder N_ES | [floor(B/N_ES)]N_R bits |

FIG. 12

| | 1 | $N_{ES}+1$ | $2N_{ES}+1$ | ... | ... | ... | |
|---|---|---|---|---|---|---|---|
| Encoder 1 | 2 | $N_{ES}+2$ | $2N_{ES}+2$ | ... | ... | ... | |
| Encoder 2 | ... | ... | ... | ... | ... | ... | |
| Encoder $(\text{mod}(B, N_{ES}))$ | k | $N_{ES}+k$ | ... | ... | ... | ... | $BN_R$ |
| Encoder $(\text{mod}(B, N_{ES})+1)$ | k+1 | $N_{ES}+k+1$ | ... | ... | ... | ... | |
| Encoder $N_{ES}$ | ... | ... | ... | ... | ... | ... | |
| | $N_{ES}$ | $2N_{ES}$ | ... | ... | ... | ... | |

| Encoder 1 | 1 | $N_{ES}+1$ | ... | ... |
|---|---|---|---|---|
| Encoder 2 | 2 | $N_{ES}+2$ | ... | ... |
| Encoder (mod(B, $N_{ES}$)) | ... | ... | ... | ... |
| | k | $N_{ES}+k$ | ... | B |
| Encoder (mod(B, $N_{ES}$)+1) | k+1 | $N_{ES}+k+1$ | ... | |
| | ... | ... | ... | |
| Encoder $N_{ES}$ | $N_{ES}$ | $2N_{ES}$ | ... | |

FIG. 13

ENCODING PARAMETERS FOR A WIRELESS COMMUNICATION SYSTEM

CROSS-REFERENCES TO RELATED APPLICATIONS

The present disclosure is a continuation of U.S. patent application Ser. No. 13/957,309 (now U.S. Pat. No. 9,264, 287), entitled "Encoding Parameters for a Wireless Communication System," filed Aug. 1, 2013, which claims the benefit of U.S. Provisional Application No. 61/678,531, entitled "Avoiding MCS Exclusions in 11ac," filed on Aug. 1, 2012. Additionally, U.S. patent application Ser. No. 13/957,309 is a continuation-in-part of U.S. patent application Ser. No. 13/246,577 (now U.S. Pat. No. 8,873,652), entitled "Parsing and Encoding Methods in a Communication System," filed Sep. 27, 2011, which claims the benefit of U.S. Provisional Application No. 61/390,971, entitled "Avoiding MCS Exclusions in 11ac," filed on Oct. 7, 2010. The disclosures of all of the applications referenced above are hereby incorporated by reference herein in their entireties.

FIELD OF THE DISCLOSURE

The present disclosure relates generally to communication networks and, more particularly, to parsing and encoding methods in a wireless communication system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards such as the Institute for Electrical and Electronics Engineers (IEEE) 802.11a, 802.11b, 802.11g, and 802.11n Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In an embodiment, a method for generating a physical layer (PHY) data unit for transmission via a communication channel includes receiving a plurality of information bits to be included in the PHY data unit. The method also includes adding a number of padding bits to the information bits, wherein the number of padding bits is determined based on respective virtual values of each of one or more encoding parameters. The method further includes parsing the information bits to a number of encoders and encoding the information bits using the number of encoders to generate coded bits. The method further still includes padding the coded bits such that padded coded bits correspond to respective true values of each of the one or more encoding parameters. The method additionally includes generating the PHY data unit to include the padded coded bits.

In another embodiment, and apparatus comprises a network interface configured to receive a plurality of information bits to be included in a PHY data unit. The network interface is also configured to add a number of padding bits to the information bits, wherein the number of padding bits is determined based on a respective virtual value of each of one or more encoding parameters. The network interface is further configured to parse the information bits to a number of encoders and encode the information bits using the number of encoders to generate coded bits. The network interface is further still configured to pad the coded bits such that padded coded bits correspond to respective true values of each of the one or more encoding parameters. The network interface is additionally configured to generate the PHY data unit to include the coded bits.

In yet another embodiment, a method for generating a physical layer (PHY) data unit for transmission via a communication channel includes receiving a plurality of information bits to be included in the PHY data unit. The method also includes determining a number of encoders to be used to encode the information bits, wherein the number of encoders is determined (i) according to a first scheme when a first system configuration is utilized and (ii) according to a second scheme when a second system configuration is utilized. The method further includes parsing the information bits to a number of encoders and encoding the information bits using the number of encoders to generate coded bits. The method additionally includes generating the PHY data unit to include the coded bits.

In still another embodiment, an apparatus comprises a network interface configured to receive a plurality of information bits to be included in a PHY data unit. The network interface is also configured to determine a number of encoders to be used to encode the information bits, wherein the number of encoders is determined (i) according to a first scheme when a first system configuration is utilized and (ii) according to a second scheme when a second system configuration is utilized. The network interface is further configured to parse the information bits to a number of encoders and encode the information bits using the number of encoders to generate coded bits. The network interface is additionally configured to generate the PHY data unit to include the coded bits.

BRIEF DESCRIPTION OF THE DRAWINGS

FIG. 3 is an example modulation and coding scheme (MCS) table, according to an embodiment.

FIG. 4A illustrates a puncturing scheme, according to an embodiment.

FIG. 4B is a table for determining a puncturing pattern, according to an embodiment.

FIG. 5A illustrates another puncturing scheme, according to another embodiment.

FIG. 5B is a table for determining another puncturing pattern, according to another embodiment.

FIG. 6A illustrates another puncturing scheme, according to another embodiment.

FIG. 6B is a table for determining another puncturing pattern, according to another embodiment.

FIG. 7 is a table illustrating bit distribution to encoders, according to an embodiment.

FIG. 8 is a table illustrating a technique for parsing of bits to encoders, according to an embodiment.

FIG. 10 is a table illustrating bit distribution to encoders, according to another embodiment.

FIG. 11 is a table illustrating another bit distribution to encoders, according to another embodiment.

FIG. 12 is a table illustrating another technique for parsing bits to encoders, according to another embodiment.

FIG. 13 is a table illustrating another technique for parsing bits to encoders, according to another embodiment.

DETAILED DESCRIPTION

In embodiments described below, a wireless network device such as an access point (AP) of a wireless local area network (WLAN) transmits data streams to one or more client stations. According to an embodiment, a modulation and coding scheme (MCS)—used for transmission to a client station—is selected from a suitable set of modulation and coding schemes, for example from a modulation and coding table defined by a communication standard. In an embodiment, if a certain MCS for a particular system configuration results in violation of one or more constraints associated with certain parsing and/or coding techniques, then this MCS is excluded from consideration for at least this particular system configuration. However, in some embodiments, it is beneficial to use some system configurations at which the constraints are not satisfied, for example in order to utilize desirable data rates associated with these system configurations. Accordingly, in some embodiments, parsing rules and/or coding techniques are altered to accommodate at least some system configurations for which the constraints are not satisfied.

Figure 1:
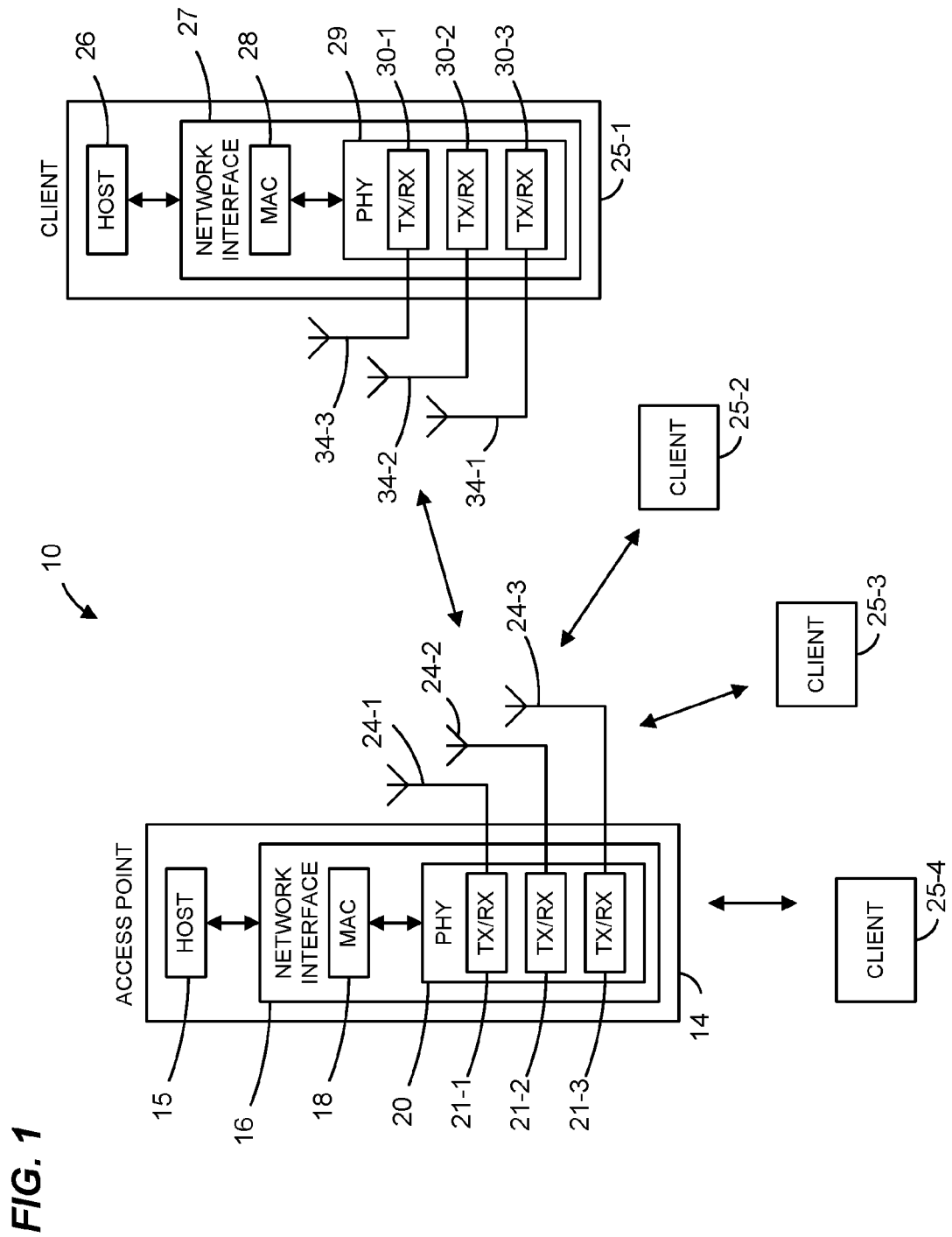
FIG. 1 is a block diagram of an example wireless communication network in which parsing and encoding techniques described herein are utilized, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol. The first communication protocol is also referred to herein as a very high throughput (VHT) protocol. In another embodiment, the MAC unit processing 18 and the PHY processing unit 20 are also configured to operate according to at least a second communication protocol (e.g., the IEEE 802.11n Standard, the IEEE 802.11g Standard, the IEEE 802.11a Standard, etc.).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or all of the client stations 25-2, 25-3 and 25-4 has a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol, according to an embodiment.

In various embodiments, the PHY processing unit 29 of the client device 25-1 is configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol, according to an embodiment.

Figure 2:
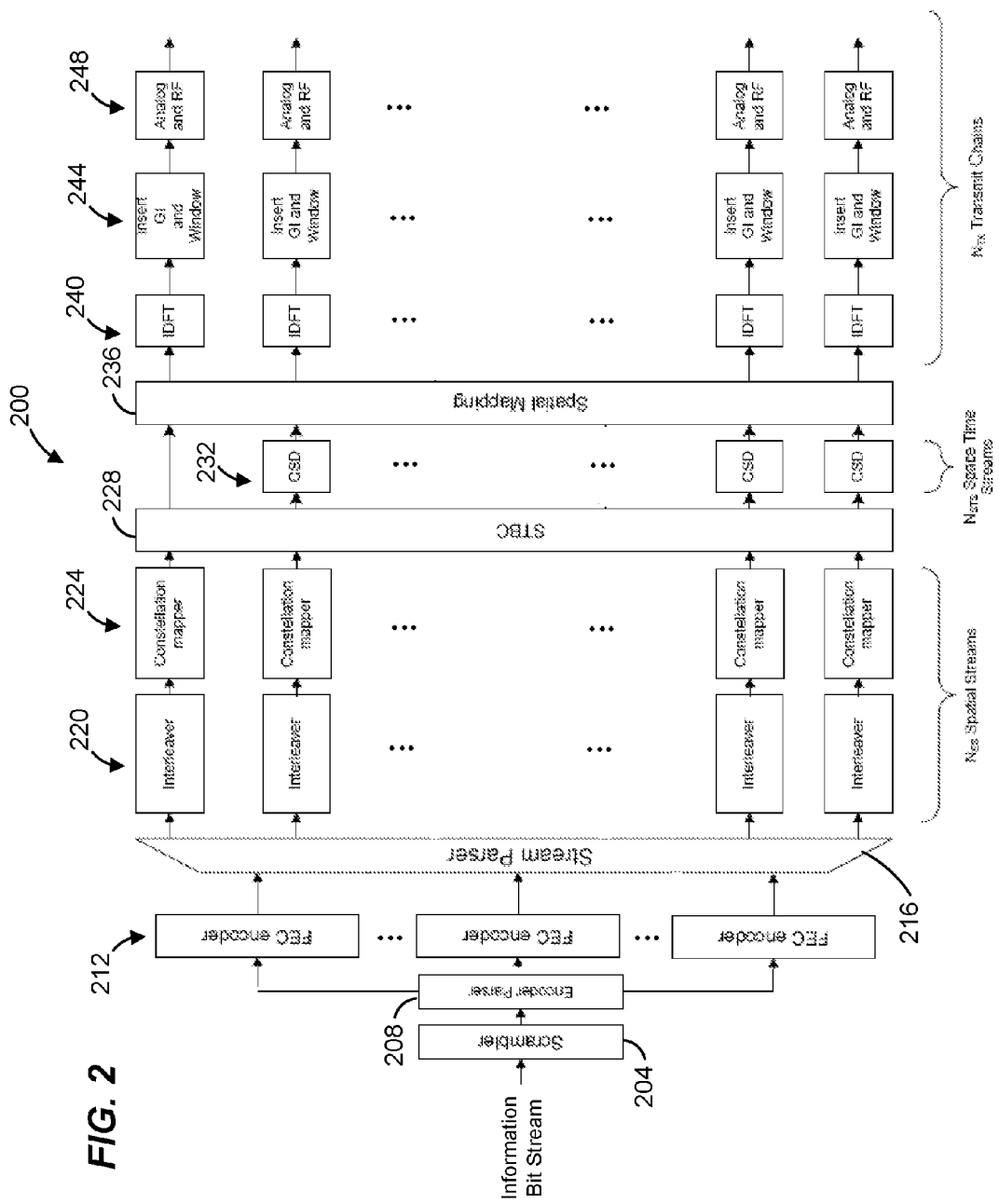
FIG. 2 is a block diagram of an example physical layer (PHY) processing unit, according to an embodiment.

FIG. 2 is a block diagram of an example PHY processing unit 200 configured to operate according to the VHT protocol, according to an embodiment. Referring to FIG. 1, the AP 14 and the client station 25-1, in one embodiment, each include a PHY processing unit such as the PHY processing unit 200.

The PHY unit 200 includes a scrambler 204 that generally scrambles an information bit stream to reduce an occurrence of long sequences of ones or zeros, according to an embodiment. In another embodiment, the scrambler 204 is replaced with a plurality of parallel scramblers located after an encoder parser 208. In this embodiment, each of the parallel scramblers has a respective output coupled to a respective one of a plurality of forward error correction (FEC) encoders 212. The plurality of parallel scramblers operates simultaneously on a demultiplexed stream. In yet another embodiment, the scrambler 204 comprises a plurality of parallel scramblers and a demultiplexer that demultiplexes the information bit stream to the plurality of parallel scramblers, which operate simultaneously on demultiplexed streams. These embodiments may be useful, in some scenarios, to accommodate wider bandwidths and thus higher operating clock frequencies.

The encoder parser 208 is coupled to the scrambler 204. The encoder parser 208 demultiplexes the information bit stream into one or more encoder input streams corresponding to one or more FEC encoders 212. In another embodiment with a plurality of parallel scramblers, the encoder parser 208 demultiplexes the information bit stream into a plurality of streams corresponding to the plurality of parallel scramblers.

Different numbers of FEC encoders 212 operate in parallel in various embodiments and/or scenarios. For example, according to one embodiment, the PHY processing unit 200 includes four FEC encoders 212, and one, two, three, or four encoders operate simultaneously depending on the particular MCS, bandwidth, and the number of spatial streams. In another embodiment, the PHY processing unit 200 includes five FEC encoders 212, and one, two, three, four, or five encoders operate simultaneously. In another embodiment, the PHY unit 200 includes up to ten FEC encoders 212, and one, two, three, four, five, six, seven, eight, nine or ten encoders operate simultaneously depending on the particular MCS, bandwidth, and guard interval being utilized. In one embodiment, the number of encoders used for a particular system configuration is based on the data rate corresponding to a short guard interval (SGI) defined in the VHT protocol. In an embodiment, the number of encoders operating simultaneously increments at multiples of the data rate, e.g., every 600 Mbps. In other words, one encoder is utilized for data rates up to 600 Mbps, two encoders are utilized for data rates between 600 Mbps and 1200 Mbps, as an example.

Each FEC encoder 212 encodes the corresponding input stream to generate a corresponding encoded stream. In one embodiment, each FEC encoder 212 includes a binary convolutional coding (BCC) encoder. In another embodiment, each FEC 212 encoder includes a binary convolutional encoder followed by a puncturing block. In another embodiment, each FEC encoder 212 includes a low density parity check (LDPC) encoder. In yet another embodiment, each FEC encoder 212 additionally includes a binary convolutional encoder followed by a puncturing block. In this embodiment, each FEC encoder 212 is configured to implement one or more of 1) binary convolutional encoding without puncturing; 2) binary convolutional encoding with puncturing; or 3) LDPC encoding.

A stream parser 216 parses the one or more encoded streams into one or more spatial streams for separate interleaving and mapping into constellation points. Corresponding to each spatial stream, an interleaver 220 interleaves bits of the spatial stream (i.e., changes the order of the bits) to prevent long sequences of adjacent noisy bits from entering a decoder at the receiver. Also corresponding to each spatial stream, a constellation mapper 224 maps an interleaved sequence of bits to constellation points corresponding to different subcarriers of an orthogonal frequency division multiplexing (OFDM) symbol. More specifically, for each spatial stream, the constellation mapper 224 translates every bit sequence of length $\log_2(C)$ into one of C constellation points, in an embodiment. The constellation mapper 224 handles different numbers of constellation points depending on the MCS being utilized. In an embodiment, the constellation mapper 224 is a quadrature amplitude modulation (QAM) mapper that handles C=2, 4, 16, 64, 256, and 1024. In other embodiments, the constellation mapper 224 handles different modulation schemes corresponding to C equaling different subsets of at least two values from the set {2, 4, 16, 64, 256, 1024}.

In an embodiment, a space-time block coding unit 228 receives the constellation points corresponding to the one or more spatial streams and spreads the spatial streams to a greater number of space-time streams. In some embodiments, the space-time block coding unit 228 is omitted. A plurality of cyclic shift diversity (CSD) units 232 are coupled to the space-time block unit 228. The CSD units 232 insert cyclic shifts into all but one of the space-time streams (if more than one space-time stream) to prevent unintentional beamforming. For ease of explanation, the inputs to the CSD units 232 are referred to as space-time streams even in embodiments in which the space-time block coding unit 228 is omitted.

A spatial mapping unit 236 maps the space-time streams to transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

Each output of the spatial mapping unit 236 corresponds to a transmit chain, and each output of the spatial mapping unit 236 is operated on by an inverse discrete Fourier transform (IDFT) calculation unit 240, e.g., an inverse fast Fourier transform calculation unit, that converts a block of constellation points to a time-domain signal. Outputs of the IDFT units 240 are provided to GI insertion and windowing units 244 that prepend, to each OFDM symbol, a guard interval (GI) portion, which is a circular extension of the OFDM symbol in an embodiment, and smooth the edges of each symbol to increase spectral delay. Outputs of the GI insertion and windowing units 244 are provided to analog and RF units 248 that convert the signals to analog signals and upconvert the signals to RF frequencies for transmission. The signals are transmitted in a 20 MHz, a 40 MHz, an 80 MHz, a 120 MHz, or a 160 MHz bandwidth channel, in various embodiments and/or scenarios. In other embodiments, other suitable channel bandwidths are utilized.

In an embodiment, a particular modulation and coding scheme (MCS) utilized by the PHY processing unit 200 (FIG. 2) is selected from a suitable set of MCSs (e.g., from an MCS table). An example MCS table, according to one embodiment, is provided in the table of FIG. 3. The selected MCS, in combination with other specifics of the system setup, such as, for example, the channel bandwidth being utilized, the number of tones in an OFDM symbol used for transmitting data ("data tones"), the number of spatial streams, the guard interval length etc., generally determines the data rate of transmission, according to an embodiment. Various example transmission channels and tone mappings that are utilized in some embodiments of the present disclosure are described in U.S. patent application Ser. No. 12/846,681, entitled "Methods and Apparatus for WLAN Transmission", filed on Jul. 29, 2010, which is hereby incorporated by reference herein in its entirety. In an embodiment, the data rate, in turn, determines the number of encoders that are needed to operate in parallel ("operating encoders") to generate the data unit.

Referring now to FIG. 2, according to an embodiment, the encoder parser 208 assigns bits to the operating FEC encoders 212 in accordance with certain encoder parsing rules. For example, in an embodiment, according to a first encoder parser rule, the encoder parser 208 assigns bits to the operating FEC encoders 212 in a round robin fashion, assigning one bit to each operating FEC encoder 212 in one cycle. Further, in an embodiment, according to a second encoder parsing rule, each of the operating FEC encoders 212 operates on an equal number of information bits, and, accordingly, the encoder parser 208 assigns an equal number of information bits to each of the operating FEC encoders 212.

Similarly, after the information bits are encoded by the operating FEC encoders 212, the stream parser 216 allocates the coded bits to a number of spatial streams in accordance with spatial stream parsing rules, according to an embodiment. In one embodiment, for example, the stream parser 216 uses the output of each FEC encoder 212 in a round robin fashion, assigning S bits from one FEC encoder 212 to each spatial stream in one cycle, where:

$$S = \sum_{i_{SS}=1}^{N_{SS}} \max\left\{1, \frac{N_{BPSCS}(i_{SS})}{2}\right\} \quad \text{Equation 1}$$

and where $N_{SS}$ is the number of spatial streams and $N_{BPSCS}$ ($i_{SS}$) is the number of coded bits per carrier for spatial stream $i_{SS}$. In other words, according to this parsing rule, the stream parser 216 assigns $N_{SS} \times S$ bits from each operating FEC encoder 212, in a round robin fashion, to the $N_{SS}$ spatial streams, assigning S consecutive bit blocks from one encoder to each of the $N_{SS}$ spatial streams in a cycle, according to an embodiment. Further, in an embodiment, according to a second spatial stream parsing rule, an equal number of coded bits from each of the operating FEC encoders 212 is assigned to each of the $N_{SS}$ spatial streams. That is, in accordance with this parsing rule, each operating FEC encoder 212 contributes an equal number of bits to each spatial stream.

In some embodiments, in order to satisfy various parsing and/or encoding rules, padding is utilized to ensure that the encoder parser 208 and/or the spatial stream parser 216 operates on a suitable number of bits. Padding generally involves adding bits or symbols of a known value or values (e.g., zero or some other suitable value or set of values) to a set of information bits or symbols. In one embodiment, for instance, padding is utilized to ensure that the number of information bits in an OFDM symbol at the input to the encoder parser 208 is an integer multiple of the number of operating encoders as determined by the particular system configuration being utilized. In this case, padding ensures that an equal number of information bits will be input to each FEC encoder 212 after parsing by the encoder parser 208. As another example, padding is utilized to lengthen a set of information data prior to encoding and/or a set of coded bits after encoding to ensure that each of the spatial streams receives an equal number of coded bits from each operating encoder, according to an embodiment. Some padding schemes according to various embodiments and/or scenarios can be found, for example, in U.S. patent application Ser. No. 12/846,681, entitled "Methods and Apparatus for WLAN Transmission".

In some situations, however, a large number of padding bits or padding symbols is needed to satisfy certain parsing rules and/or encoding techniques. Accordingly, in some such embodiments or situations, system configurations corresponding to certain MCS/channel bandwidth/number of spatial streams combinations are not utilized for transmission. That is, in these embodiments, certain MCSs are disallowed for use with particular channel bandwidths and particular numbers of spatial streams, or, alternatively, certain MCSs are completely excluded from the set of allowed MCSs (e.g., from an MCS table). For instance, in one such embodiment, an MCS is not allowed for a particular channel bandwidth if the corresponding number of data bits per symbol ($N_{DBPS}$) is not an integer. This constraint is referred to herein as "integer $N_{DBPS}$ constraint". Generally, the number of coded bits in an OFDM symbol, in an embodiment, is determined by the number of data tones corresponding to the channel bandwidth being utilized, the constellation size determined by the MCS, and the number of spatial streams. The corresponding number of data bits (or information bits) in a data unit, according to an embodiment, is determined by the coding rate, also specified by the MCS. Accordingly, in an embodiment, the integer $N_{DBPS}$ constraint excludes (disallows) an MCS for a particular system configuration (or for all system configurations) if the number of data bits corresponding to the number of coded bits as determined by the coding rate specified by the particular MCS is not an integer. In some embodiments, the integer $N_{DBPS}$ constraint excludes at least some MCSs that correspond to peak or close to peak data rates for the respective system configurations. For example, in an embodiment, the integer $N_{DBPS}$ constraint excludes an MCS specifying 256 QAM modulation and a coding rate of 5/6 for a 20 MHz channel (with 52 data tones), and this MCS, in one embodiment, corresponds to the highest throughput for a 20 MHz channel.

In addition to MCS exclusions according to the integer $N_{DBPS}$ constraint, in one embodiment, an MCS is excluded from allowed MCSs for a particular system configuration (or all system configurations) if equal encoder parsing for the corresponding number of $N_{DBPS}$ cannot be achieved. This constraint is referred to herein as "integer $N_{DBPS}/N_{ES}$ constraint". That is, in an embodiment, the integer $N_{DBPS}/N_{ES}$ constraint excludes an MCS for use with a particular system configuration (or all system configurations) if the $N_{DBPS}/N_{ES}$ for the system configuration is not an integer. As an illustrative example, the integer $N_{DBPS}/N_{ES}$ constraint excludes an MCS specifying 256 QAM modulation and a coding rate of 5/6 for an 80 MHz channel with 6 spatial streams, according to one embodiment.

Additionally, in some embodiments, a third constraint is that the number of information bits in data unit fits in an integer number of OFDM symbols after having been encoded. For example, in one embodiment, the number of OFDM symbols in a data packet is signaled to a receiver (e.g., in a preamble portion of a data unit), and in this embodiment a receiver needs to operate on a corresponding integer number of OFDM symbols in order to properly decode the information bits. In some such embodiments, padding (i.e., addition of a certain number of padding bits) is utilized to ensure that the number of information bits corresponding to a data unit fits in an integer number of OFDM symbols.

As discussed above, the integer $N_{DBPS}$ constraint and/or the integer $N_{DBPS}/N_{ES}$ constraint, alone or in combination, in some embodiments, lead to exclusions of certain system configurations that correspond to desirable high data rates (and, consequently, high data throughputs). Additionally, in some situations, exclusion of certain MCSs that do not satisfy the integer $N_{DBPS}$ constraint and/or the integer $N_{DBPS}/N_{ES}$ constraint results in non smooth data rate adaptation due to large data rate jumps because an excluded MCS has to be skipped in the adaptation process. Accordingly, in some embodiments, certain parsing rules and/or encoding techniques are altered to allow an MCS (or a system configuration utilizing the MCS) even in situations in which the integer $N_{DBPS}$ constraint and/or the integer $N_{DBPS}/N_{ES}$ constraint for the system configuration are not satisfied.

According to an embodiment, to accommodate situations in which both the integer $N_{DBPS}$ and the integer $N_{DBPS}/N_{ES}$ constraints are not satisfied, unequal bit distribution to the multiple operating encoders is allowed, and, additionally, the last block in a data unit (or the last block in an OFDM symbol) is encoded differently from the previous blocks. In some such embodiments, if more than one encoder is utilized, data bits are distributed to the multiple encoders such that the last block is encoded differently from the previous blocks by only one of the encoders. In another embodiment, bits are distributed among multiple encoders such that more than one of the encoders utilizes a different encoding technique for the respective last block.

More specifically, in one embodiment in which a last block in a data unit is encoded differently from the previous blocks, a number of punctured blocks needed to fit all information bits in a data unit is first calculated according to Equation 2:

$$Z = \left\lceil \frac{(8L + N_{service} + N_{tail}N_{ES})}{N_R} \right\rceil \qquad \text{Equation 2}$$

where L is the number of information bits expressed in octets, $N_{service}$ is a number of service bits included in a data unit (e.g., service bits in a data portion of the data unit), and $N_{tail}$ is a number of tail bits (e.g., tail bits included for BCC encoding), $N_{ES}$ is the number of operating encoders, $N_R$ is determined by the corresponding coding rate R, where $R=N_R/D_R$, and $\lceil \ \rceil$ denotes the integer ceiling function.

The number of OFDM symbols corresponding to the number of punctured blocks is then calculated, in an embodiment, according to Equation 3:

$$N_{SYM} = \left\lceil \frac{ZD_R}{N_{CBPS}} \right\rceil \qquad \text{Equation 3}$$

where $D_R$ is determined by the corresponding coding rate R, where $R=N_R/D_R$.

According to an embodiment, the number of padding bits to be added to the information bits before encoding is then calculated according to Equation 4:

$$p = \left\lfloor \frac{(N_{SYM}N_{CBPS})}{D_R} \right\rfloor N_R - (8L + N_{service} + N_{tail}N_{ES}) \qquad \text{Equaiton 4}$$

That is, in this embodiment, the number of padding bits added to information bits before encoding ("pre-encoding padding bits") is based on the maximum integer number of punctured blocks that fit all information bits in a data unit. Accordingly, in an embodiment, in the last OFDM symbol, $q_1$ additional coded bits are needed to reach the OFDM symbol boundary, where, $q_1$ is determined according to Equation 5:

$$q_1 = \text{mod}(N_{SYM}N_{CBPS}, D_R) \qquad \text{Equation 5}$$

In this embodiment, $q_1$ padding bits are then added to the last block of the last OFDM symbol after coding ("post-encoding padding bits").

Alternatively, in another embodiment in which a last block in a data unit is encoded differently from the previous blocks, dynamic puncturing for the last block of the last OFDM symbol is utilized. FIG. 4A illustrates a puncturing scheme defined for a coding rate of ⅚, according to one such embodiment. More specifically, in this embodiment, each coded block of 10 bits is punctured to 6 coded bits according to the pattern illustrated in the figure, where the shaded areas represent the punctured bits. In the last OFDM symbol, however, in an embodiment, the last block of coded bits is less than 10 in some situations. Accordingly, in this case, the last block is punctured differently from the preceding blocks, according to an embodiment.

FIG. 4B is a table from which a puncturing pattern can be determined for a coding rate of ⅚ based on the number of punctured bits needed to fill the last OFDM symbol, according to one embodiment. More specifically, the first column in the table indicates the number x of required punctured bits in the last block of the last OFDM symbol. The number of coded bits required to generate the x punctured bits is then indicated by the corresponding row in the second column. The third column indicates the number of uncoded bits (or the number of information bits) needed to generate the required number of coded bits. Accordingly, in an embodiment, this number of information bits is used in calculating the number of required padding bits that need to be added to the information bits before encoding, and the last block is then punctured according to FIG. 4B.

FIG. 5A illustrates a puncturing pattern for the code rate of ¾, according to an embodiment. FIG. 5B is a table from which a puncturing pattern can be determined for a coding rate of ¾ based on the number of punctured bits needed to fill the last OFDM symbol, according to one embodiment, in a similar manner to that described above with reference to FIG. 5B. Similarly, FIG. 6A illustrates a puncturing pattern for the code rate of ⅔, according to an embodiment, and, in an embodiment, a puncturing pattern derived from the pattern of FIG. 6A for a number of punctured bits in the last block of the last OFDM symbol is determined from the table of FIG. 6B. In other embodiments in which a last block in a data unit is encoded differently from the previous blocks, other methods for determining a puncturing pattern and/or a coding rate for a last block in a data unit are utilized.

As indicated in FIG. 4B, FIG. 5B and FIG. 6B, in an embodiment, these tables are generally not used for a situation in which only one punctured bit is needed in the last block of the last OFDM. In an embodiment, such situations would occur only if the condition of Equation 6 is satisfied:

$$\text{mod}(N_{CBPS}*N_{SYM}, D_R) = \text{mod}((N_{tones}*M*N_{SS})*N_{SYM}, D_R) = 1 \qquad \text{Equation 6}$$

According to an embodiment, this condition is not satisfied for 40 MHz, 80 MHz and 160 MHz channels (with 108, 234 and 468, respectively) for any MCS defined by the VHT protocol. Further, in an embodiment, for a 20 MHz channel, the condition represented by Equation 6 is not satisfied for any disallowed system configuration.

In an embodiment utilizing dynamic puncturing, the number of symbols needed to fit all information bits in a data unit is first calculated according to Equation 7:

$$N_{SYM} = \left\lceil \frac{(8L + N_{service} + N_{tail}N_{ES})}{N_{DBPS}} \right\rceil \qquad \text{Equation 7}$$

where L is the number of information bits expressed in octets, $N_{service}$ is a number of service bits included in a data unit (e.g., service bits in a data portion of the data unit), and $N_{tail}$ is a number of tail bits (e.g., tail bits included for BCC encoding), $N_{ES}$ is the number of operating encoders, $N_{DBPS}$ is the number of data bits per OFDM symbol, and ⌈ ⌉ denotes the integer ceiling function.

According to an embodiment, the number of coded bits is then represented as Equation 8:

$$N_{SYM}N_{CBPS} = D_R \left\lfloor \frac{N_{SYM}N_{CBPS}}{D_R} \right\rfloor + N_{residue} \quad \text{Equation 8}$$

where $D_R$ is determined by the corresponding coding rate R, where $R=N_R/D_R$.

In this embodiment, $N_{residue}$ corresponds to a residue block of information bits that do not fit into an integer number of puncturing blocks. In one embodiment, $N_{residue}$ is expressed by Equation 9:

$$N_{residue} = \text{mod}(N_{SYM}N_{CBPS}, D_R) \quad \text{Equation 9}$$

Figure 9:
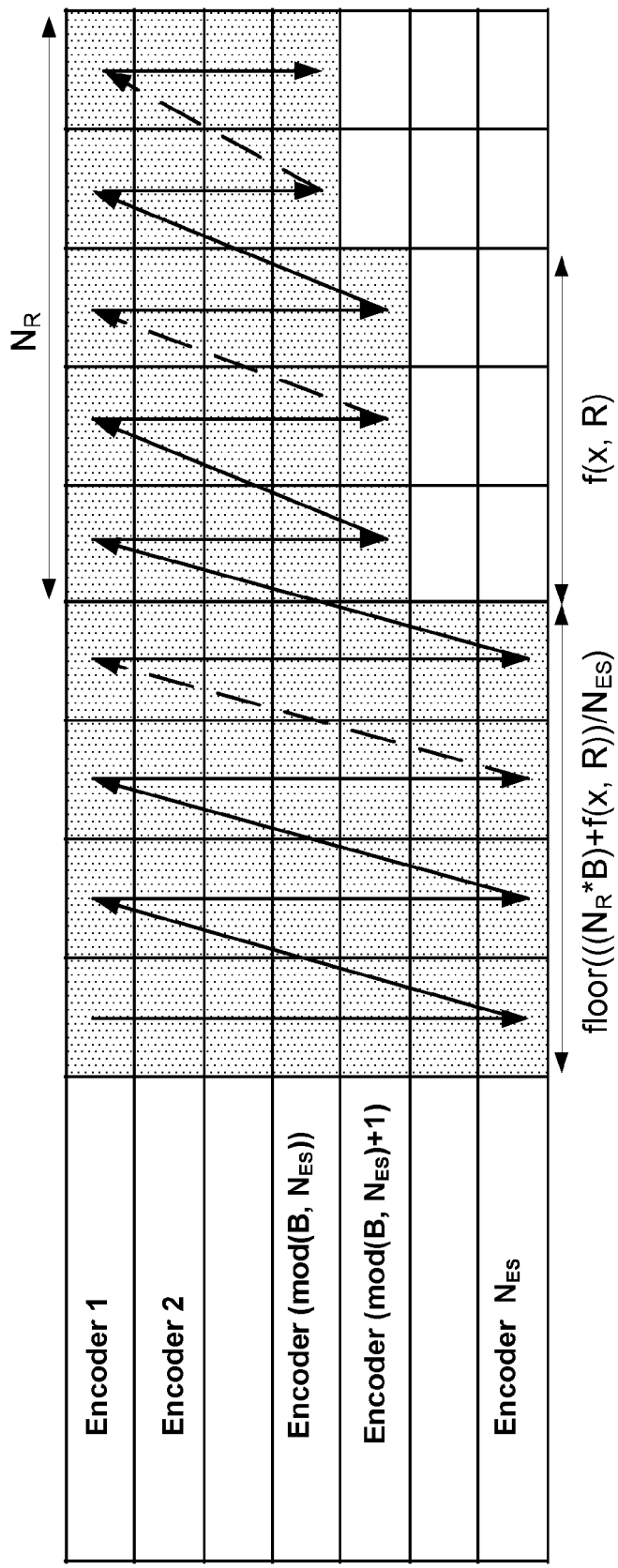
FIG. 9 is a table illustrating another technique for parsing of bits to encoders, according to another embodiment.

A corresponding puncturing table, such as, for example, depending on the particular coding rate being utilized, the corresponding table of FIGS. 7-9, in one embodiment, is then utilized to determine the number of information bits needed to generate $N_{residue}$ punctured bits, according to an embodiment. The number of information bits in a data unit needed to utilize this puncturing scheme is then determined, in an embodiment, according to Equation 10:

$$Z = N_R \left\lfloor \frac{N_{SYM}N_{CBPS}}{D_R} \right\rfloor + f(N_{residue}, R) \quad \text{Equation 10}$$

where $f(x,R)$ is the number of information bits needed to generate x bits for the code rate R.

Accordingly, the number of required padding bits that are added to the information bits before encoding is then calculated, in an embodiment, according to Equation 11:

$$p = \left\lfloor \frac{N_{SYM}N_{CBPS}}{D_R} \right\rfloor N_R + f(N_{residue}, R) - (8L + N_{service} + N_{tail}N_{ES}) \quad \text{Equation 11}$$

In an illustrative example, 4 punctured coded bits (i.e., 4 coded bits after puncturing) are needed to reach the end of the last OFDM symbol. In this example, a single encoder is used, and the coding rate is 5/6. According to the table of FIG. 4A, 3 information bits are, in this case, needed in the last puncturing block of the last OFDM symbol. In this example, B complete blocks of 10 coded bits per block are punctured to 6 coded bits, for example, according to the puncturing pattern illustrated in FIG. 4A. The remaining 3 information bits, in this example, are encoded and punctured according to the corresponding entry in the table of 4B. Therefore, in this scenario, the total number of information bits in the data unit is equal to $N_R*B+3$, and the number of needed padding bits (to be added to the information bits before encoding) is then calculated according to Equation 12:

$$p = N_R B + f(4,R) - (8L + N_{service} + N_{tail}N_{ES}) \quad \text{Equation 12}$$

In some embodiments utilizing dynamic puncturing, information bits are distributed among operating encoders in a manner that generally results in a more equal bit distribution among multiple encoders. To this end, in one embodiment, the number of residue bits is calculated such that this number depends on the number of operating encoders. For example, in one such embodiment, the number of coded bits is then represented as:

$$N_{SYM}N_{CBPS} = N_{ES}D_R \left\lfloor \frac{N_{SYM}N_{CBPS}}{N_{ES}D_R} \right\rfloor + N_{residue} \quad \text{Equation 13}$$

where the number of symbols ($N_{SYM}$), in this case, is calculated according to Equation 7.

In this embodiment, $N_{residue}$ is the calculated according to Equation 14:

$$N_{residue} = \text{mod}(N_{SYM}N_{CBPS}, N_{ES}D_R) \quad \text{Equation 14}$$

The number of padding bits is then, according to an embodiment, calculated differently depending on whether $N_{residue}$ is greater than, or less than or equal to $2N_{ES}$. In an embodiment, in the case of $N_{residue} > 2N_{ES}$, the number of necessary padding bits is determined according to Equation 15:

$$p = \left\lfloor \frac{(N_{SYM}N_{CBPS})}{N_{ES}D_R} \right\rfloor N_R N_{ES} + \\ \left( N_{ES} f\left( \left\lfloor \frac{N_{residue}}{N_{ES}} \right\rfloor \right) + \text{mod}(N_{residue}, N_{ES}) \right) - \\ (8L + N_{service} + N_{tail}N_{ES}) \quad \text{Equation 15}$$

On the other hand, in the case of $N_{residue} <= 2N_{ES}$, in this embodiment, the number of necessary padding bits is calculated according to Equation 16:

$$p = \left\lfloor \frac{(N_{SYM}N_{CBPS})}{N_{ES}D_R} \right\rfloor N_R N_{ES} + \\ \frac{N_{residue}}{2} - (8L + N_{service} + N_{tail}N_{ES}) \quad \text{Equation 16}$$

In one embodiment, the padded information bits, with the number of padding bits determined according to Equation 15 or Equation 16, are then distributed to the operating encoders, in a round robin fashion, assigning one bit to each operating encoder in one cycle, until all information bits are distributed among the encoders in this manner. In another embodiment, the number of padded information bits are distributed to the operating encoders according to a different parsing technique.

FIG. 7 is a table illustrating an unequal bit distribution to encoders, according to one such embodiment. In this embodiment, as a result of this final bit distribution, only one encoder utilizes different encoding for the last block. That is, in this embodiment, only one encoder receives a number of bits that necessitates different encoding for a last block to be utilized. In one embodiment, bit distribution of FIG. 7 is utilized, for example, when a number of padding bits is determined according to Equation 11. In other embodiments utilizing dynamic puncturing with unequal parsing of information bits to operating encoders, final bit distributions other than that illustrated in FIG. 7 are utilized, including in situations in which Equation 11 is used for calculating a corresponding number of padding bits. In some embodiments, for example, more than one encoder is assigned a number of bits for which the last block needs to be encoded differently from the previous blocks.

FIG. 8 is a table illustrating one specific technique for unequal parsing of information bits to operating encoders, resulting in the final bit distribution illustrated in FIG. 7, according to one embodiment. Each shaded block in FIG. 8 represents a block of $N_R$ bits, except for the last, lightly shaded block, which represents the last block of information bits, which, in an embodiment, contains a number of bits less than $N_R$ bits. In one embodiment, this last block corresponds to $f(N_{residue}, R)$, where $N_{residue}$ is the number of coded bits needed to fill the last OFDM symbol, according to one embodiment (e.g., determined using Equation 9 or Equation 14). Accordingly, in this embodiment, only one encoder (i.e., Encoder (mod(B, $N_{ES}$) in FIG. 8) utilizes different encoding for the last block.

FIG. 9 is a table illustrating another specific technique for unequal parsing of information bits to multiple encoders, according to another embodiment. In this embodiment, one bit is assigned to each operating encoder, in a round robin fashion, in the order illustrated in FIG. 9.

FIG. 10 is a table illustrating unequal bit distribution to the operating encoders as an alternative to the bit distribution of FIG. 7, according to an embodiment. In this embodiment, $x_1$ through $x_n$ are selected such that different encoding of the last block, in this case, is utilized at each operating encoder, rather than only the last operating encoder as in an embodiment consistent with FIG. 7. In various other embodiments and/or scenarios, information bits are assigned to the operating encoders using any suitable parsing technique to achieve the final distribution illustrated in FIG. 10 or a different final distribution.

With reference to FIG. 2, the encoder parser 208 assigns an unequal number of information bits to the operating encoders 212 as illustrated in FIG. 8, according to one embodiment. The encoder parser 208 assigns an unequal number of information bits to the operating encoders 212 as illustrated in FIG. 9, according to another embodiment. According to another embodiment, the encoder parser 208 utilizes another suitable parsing technique to assign an unequal number of bits to the operating encoders 212. Similarly, unequal bit distribution different from the bit distribution illustrated in the table of FIG. 7 or the table of FIG. 10 is utilized in another embodiment.

Alternatively, another way of accommodating certain system configurations which do not satisfy the integer $N_{DBPS}$ constraint and/or the integer $N_{DBPS}/N_{ES}$ constraint, is to utilize a "virtual" number of coded bits per symbol ($N_{CBPS}$) for calculating a required number of padding bits (wherein padding bits are added before encoding to ensure that the data stream fits in an integer number of OFDM symbols), according to an embodiment. Generally, the "true" number of coded bits per symbol for a particular system configuration is determined at least by the corresponding MCS, the channel bandwidth, and the number of spatial streams used to transmit the data unit. In some situations, the coded number of bits per symbol corresponding to a particular system configuration results in violation of the integer $N_{DBPS}$ constraint and/or the integer $N_{DBPS}/N_{ES}$ constraint. In one such embodiment, a virtual number of coded bits per symbol is selected such that both the integer $N_{DBPS}$ constraint and/or the integer $N_{DBPS}/N_{ES}$ constraint are satisfied (for the $N_{DBPS}$ and the $N_{ES}$ corresponding to the virtual $N_{CBPS}$). In an embodiment, the virtual number of coded bits is lower than the true number of coded bits, and in this embodiment, after the required number of padding bits based on the virtual $N_{CBPS}$ is added to the information bits and the information bits are encoded by a number of encoders, additional padding bits are added to each OFDM symbol such that, after padding, each OFDM symbol includes the true number of coded bits per symbol.

As an illustrative example, in an embodiment, in a case of a 20 MHz channel with a true $N_{CBPS}$ equal to 52, a virtual number $N_{CBPS}$ of 48 is utilized for calculating the number of OFDM symbols and a corresponding number of padding bits. Accordingly, in this embodiment, 4 additional padding bits are then added to each OFDM symbol after encoding to reach the true $N_{CBPS}$ of 52 bits in each OFDM symbol. In another embodiment, a different number of virtual $N_{CBPS}$ are used and a corresponding different number of additional padding bits are added to each OFDM symbol after encoding, including another embodiment in which a 20 MHz channel is used.

In one embodiment, the number of virtual coded bits per symbol is calculated according to Equation 17:

$$N_{CBPS}^{virtual} = \left(\left\lfloor \frac{N_{CBPS}}{N_R N_{ES}} \right\rfloor N_R N_{ES}\right)$$

Equation 17 where $N_R$ is determined by the coding rate $R=N_R/D_R$, $N_{ES}$ is the number of operating encoders, and $\lfloor \ \rfloor$ represents the integer floor function. The number of additional padding bits to be added after encoding to reach the true number of data bits is then determined based on the calculated number of virtual coded bits and a corresponding number of true coded bits, according to an embodiment. In one example embodiment, Equation 17 is used to calculate a virtual $N_{CBPS}$ in an embodiment for the case of 80 MHz with five operating encoders discussed above, and in this embodiment, the discussed respective system configuration is allowed for transmission because, in this case, for the virtual $N_{CBPS}$, the integer $N_{DBPS}/N_{ES}$ constraint is satisfied.

In one embodiment, the additional padding bits in each OFDM symbol are then discarded on the receiving end to allow the receiver to properly decode the data. In another embodiment, the additional padding bits are utilized by a receiver in a different manner (for example, as added data bit redundancy).

In some embodiments, this technique results in a large number of additional padding bits in each OFDM symbol and, in some situations, the additional padding bits result in high throughput loss. To decrease the number of required additional padding bits, in one embodiment, unequal number of data bits per encoder is allowed. That is, in this embodiment, the integer $N_{DBPS}/N_{ES}$ constraint is not utilized. Accordingly, a virtual $N_{CBPS}$, in this case, only needs to ensure that the corresponding $N_{DBPS}$ is an integer, which, in some situations, results in a lower number of additional padding bits that needs to be added to each OFDM symbol after encoding. In one such embodiment, a virtual A $T_{CBPS}$ is calculated according to Equation 18:

$$N_{CBPS}^{virtual} = \left(\left\lfloor \frac{N_{CBPS}}{N_R} \right\rfloor N_R\right)$$

Equation 18 where $N_R$ is determined by the corresponding coding rate $R=N_R/D_R$, and $\lfloor \ \rfloor$ represents the floor function.

FIG. 11 is a table illustrating one suitable bit distribution among multiple operating encoders according to one such embodiment in which unequal number of data bits per encoder is allowed. In this embodiment, the number of information bits in a data unit is equal $B*N_R$ (i.e., B $N_R$-bit blocks), where B is an integer. As illustrated in FIG. 11, each of the encoders 1 through mod(B, $N_{ES}$) operates on a number of bits calculated as [floor(B/$N_{ES}$)+1]/$N_R$. On the other hand, each of the encoders mod(B, $N_{ES}$)+1 through $N_{ES}$ operates on a number of bits calculated as [floor(B/$N_{ES}$)]$N_R$. Accordingly, in this embodiment, each of the first mod(B, $N_{ES}$) encoders operates on $N_R$ more bits than each of the remaining operating encoders.

FIG. 12 is a table illustrating one specific technique for unequal parsing of information bits to operating encoders, resulting in the final bit distribution illustrated in FIG. 11, according to an embodiment. In this embodiment an encoder parser assigns bits to operating encoders in a round robin fashion, assigning one bit to each operating encoder in one cycle until only mod(B, $N_{ES}$) bits in a data unit remain to be parsed. Thereafter, in this embodiment, the parser then assigns the remaining bits to the first mod(B, $N_{ES}$)*$N_R$ encoders in a round robin fashion, assigning one bit to each encoder in one cycle.

FIG. 13 is a table illustrating another specific technique for unequal parsing of information bits to operating encoders resulting in the final bit distribution illustrated in FIG. 11, according to another embodiment. In the table of FIG. 13, each shaded block represents a block of consecutive $N_R$ information bits. As illustrated in the figure, therefore, in this embodiment, bits are assigned to the operating encoder in a round robin fashion with, in this case, a block of consecutive $N_R$ bits being assigned to each encoder in one cycle, according to this embodiment.

With reference to FIG. 2, the encoder parser 208 assigns an unequal number of information bits to the operating encoders 212 as illustrated in FIG. 12, according to one embodiment. The encoder parser 208 assigns an unequal number of information bits to the operating encoders 212 as illustrated in FIG. 13, according to another embodiment. According to another embodiment, the encoder parser 208 utilizes another suitable parsing technique to assign an unequal number of bits to the operating encoders 212. Similarly, unequal bit distribution different from the bit distribution illustrated in the table of FIG. 11 is utilized in another embodiment.

According to another embodiment in which unequal bit distribution to the operating encoders is allowed, an MCS is disallowed for a system configuration only if the integer $N_{DBPS}$ constraint is not satisfied. That is, in this embodiment, a system configuration corresponding to an integer $N_{DBPS}$ is allowed even if the respective $N_{DBPS}/N_{ES}$ for the required number of operating encoders is not an integer. For example, unequal bit distribution discussed above with respect to FIG. 11 is utilized in one such embodiment. In this case, however, because $N_{DBPS}$ for the allowed MCSs is always an integer, the true number of data bits per symbol (rather than a virtual $N_{DBPS}$) is distributed in this manner among the operating encoders, and, therefore, no additional padding to accommodate a virtual number of data bits per symbol, in this case, is required. Some techniques for determining a number of OFDM symbols and a corresponding number of padding bits based on a true $N_{DBPS}$ according to some such embodiments are described, for example, in U.S. patent application Ser. No. 12/846,681, entitled "Methods and Apparatus for WLAN Transmission."

Further, in various embodiments and/or scenarios in which encoder parsing results in an unequal distribution of information bits to operating encoders, spatial stream parsing (used, for example, by the stream parser 216 of FIG. 2) different from stream parsing discussed above with reference to Equation 1 needs to be utilized. Some such parsing techniques for a 160 MHz channel are described in U.S. Provisional Patent Application No. 61/387,915, filed on Sep. 29, 2010, and entitled "Stream Parsing for 160 MHz 11ac", which is hereby incorporated in its entirety herein. Such parsing techniques for a 160 MHz channel are also described in U.S. Provisional Patent Application No. 61/387,919, entitled "filed on Sep. 29, 2010, and entitled "160 MHz Stream Parser", which is hereby incorporated in its entirety herein. These or similar parsing techniques are used to parse coded bits to a number of spatial streams in some embodiments of the present disclosure in which unequal bit parsing to multiple encoders is utilized.

Parsing and encoding techniques that accommodate system configurations for which the integer $N_{DBPS}$ constraint and/or the integer $N_{DBPS}/N_{ES}$ constraint is not satisfied, such as parsing techniques and padding described herein, are utilized only for system configurations for which the one or more of the constraints are not satisfied, according to one embodiment (as an alternative to excluding these system configurations). In this embodiment, a different set of parsing and padding techniques is utilized for the system configurations for which both the integer $N_{DBPS}$ constraint and the integer $N_{DBPS}/N_{ES}$ constraint are satisfied. On the other hand, in another embodiment, the altered parsing and encoding techniques the accommodate system configurations for which the integer $N_{DBPS}$ constraint and/or the integer $N_{DBPS}/N_{ES}$ constraint is not satisfied to be utilized are used for all system configurations, including the system configurations for which both the integer $N_{DBPS}$ constraint and the integer $N_{DBPS}/N_{ES}$ constraint are satisfied. That is, in this embodiment, common parsing and encoding techniques for all MCSs and all system configurations are utilized.

Figure 14:
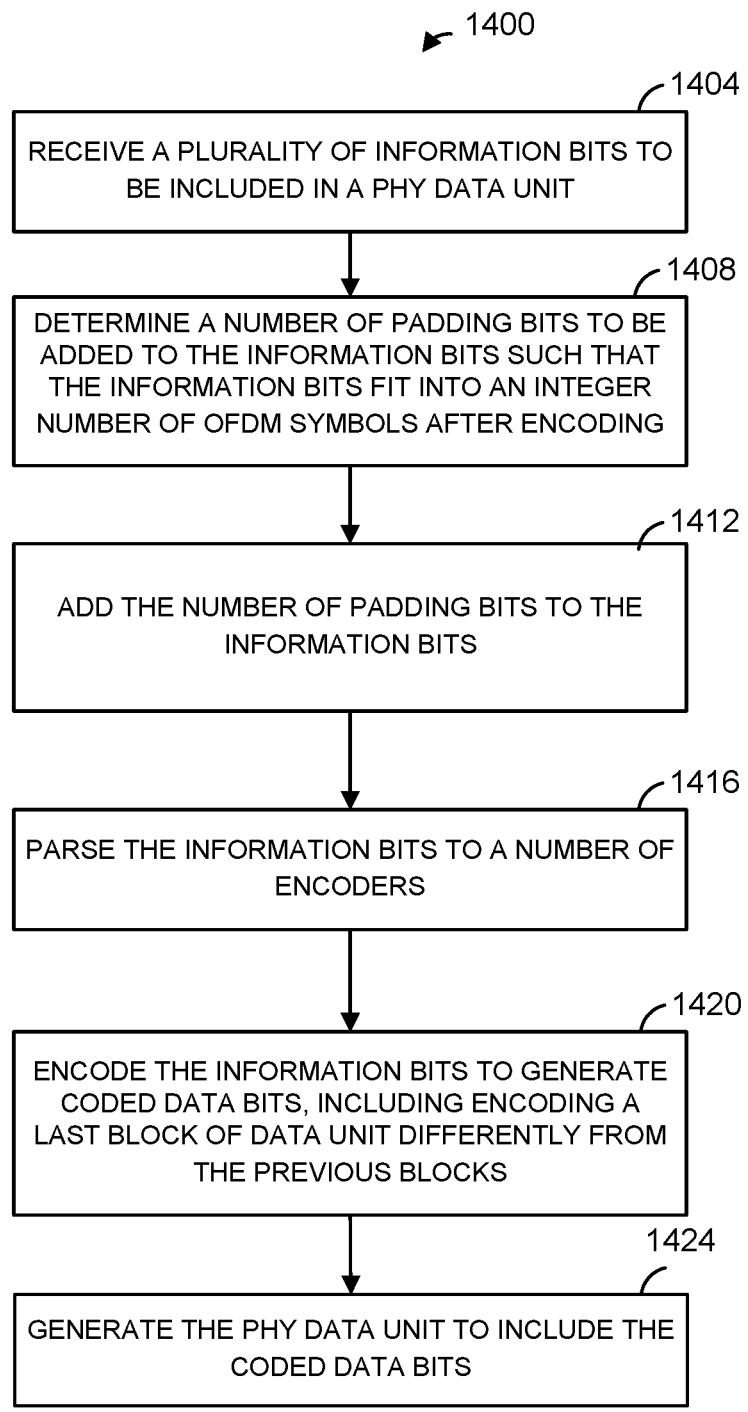
FIG. 14 is a flow diagram of an example method for generating a PHY data unit, according to an embodiment.

FIG. 14 is a flow diagram of an example method 1400 for generating a PHY data in which a last block is encoded differently from the previous blocks, according to an embodiment. With reference to FIG. 1, the method 1400 is implemented by the network interface 16, in an embodiment. For example, in one such embodiment, the PHY processing unit 20 is configured to implement the method 1400. According to another embodiment, the MAC processing 18 is also configured to implement at least a part of the method 1400. With continued reference to FIG. 1, in yet another embodiment, the method 1400 is implemented by the network interface 27 (e.g., the PHY processing unit 29 and/or the MAC processing unit 28). In other embodiments, the method 1400 is implemented by other suitable network interfaces.

At block 1404, the network interface receives a plurality of information bits to be included in a PHY data unit. At block 1408, the number of padding bits to be added to the information bits is determined. For example, in one embodiment, the number of padding bits is determined according to Equation 4. In another embodiment, the number of padding bits is determined according to Equation 11. In yet another embodiment, the number of padding bits is calculated according to one of Equation 15 or Equation 16. In another embodiment, the number of padding bits is determined in a different manner, for example, according to a different equation.

At block 1412, the information bits are padded with the number of padding bits determined at block 1408. At block 1416, the padded information bits are parsed into a number of encoders. In one embodiment, each encoder is assigned an equal number of information bits. In another embodiment, information bits are distributed to the encoders unequally. For example, in one embodiment, bit distribution illustrated in FIG. 7 is utilized. In one such embodiment, information bits are parsed at block 1406 according to the parsing technique illustrated in FIG. 8. In another embodiment, parsing technique illustrated in FIG. 9 is utilized. In another embodiment, a different bit distribution and/or a different parsing technique is utilized.

At block 1420, information bits are encoded to generate coded bits. In an embodiment, the last block of the data unit is encoded differently from the previous blocks. For example, in one embodiment, the last block is padded after encoding so that the coded bits fill the last OFDM symbol. In one such embodiment, for example, the number of additional padding bits is determined according to Equation 5. In another embodiment, the number of additional padding bits is determined in a different manner, for example, according to a different equation.

In another embodiment, dynamic puncturing is used to encode the last block of the data unit at block 1420, wherein the number of punctured bits in the last block is determined based on a number of residue bits at the end of the data unit. For example, in one embodiment, the number of residue bits corresponds to the number of bits that do not fit into an integer number of puncturing blocks. In one embodiment, the number of residue bits is determined according to Equation 9. In another embodiment, the number of residue bits is determined according to Equation 14. In another embodiment, the number of residue bits is determined in a different manner, for example, according to a different equation. In various embodiments, depending on the coding rate being utilized, a puncturing pattern used for encoding the last block of the data unit at block 1420 is determined, at block 1420, form a corresponding table of FIG. 4B, FIG. 5B, or FIG. 6B. At block 1424, the PHY data unit is generated to include the coded bits.

Figure 15:
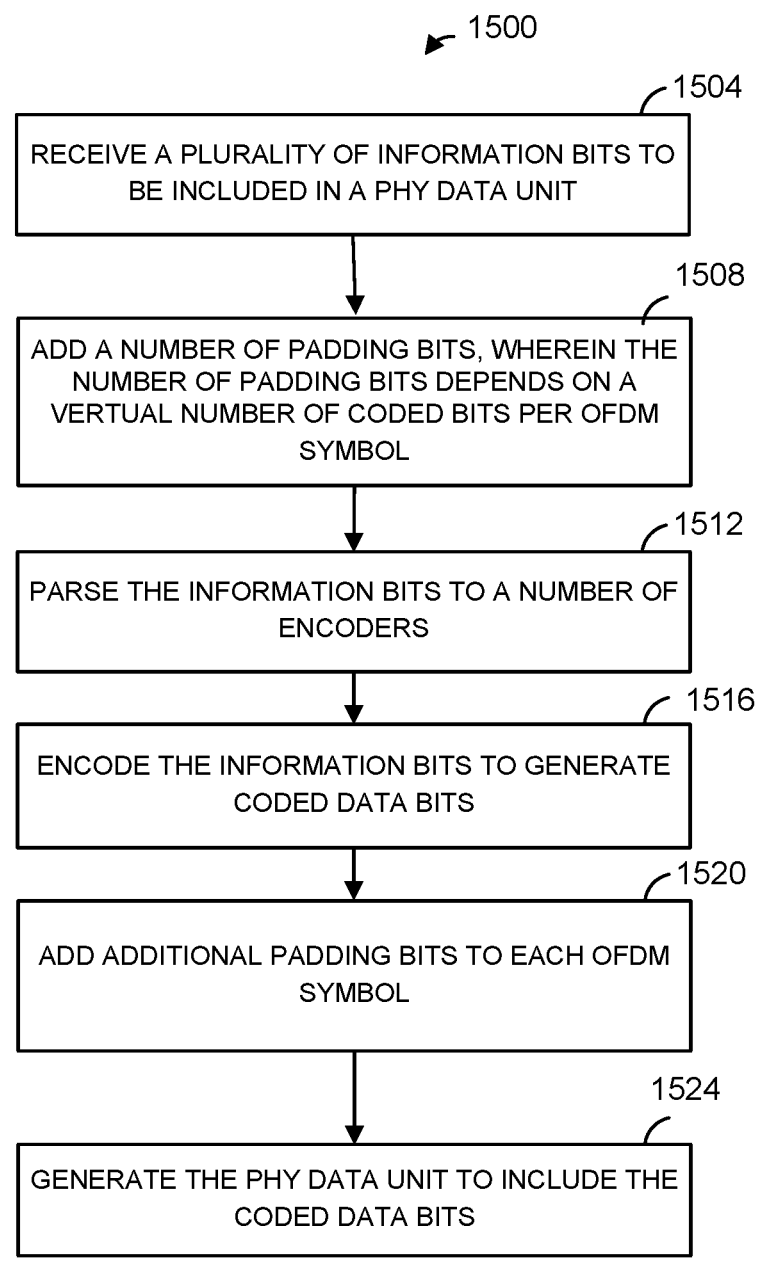
FIG. 15 is a flow diagram of another example method for generating a PHY data unit, according to another embodiment.

FIG. 15 is a flow diagram of an example method 1500 for generating a PHY data unit using a number of padding bits calculated based on a virtual number of coded bits, according to an embodiment. With reference to FIG. 1, the method 1500 is implemented by the network interface 16, in an embodiment. For example, in one such embodiment, the PHY processing unit 20 is configured to implement the method 1500. According to another embodiment, the MAC processing 18 is also configured to implement at least a part of the method 1500. With continued reference to FIG. 1, in yet another embodiment, the method 1500 is implemented by the network interface 27 (e.g., the PHY processing unit 29 and/or the MAC processing unit 28). In other embodiments, the method 1500 is implemented by other suitable network interfaces.

At block 1504, the network interface receives a plurality of information bits to be included in a PHY data unit. At block 1508, a number of padding bits is added to the information bits, wherein the number of padding bits depends on a virtual number of coded bits per OFDM symbol. In an embodiment, the virtual number of coded bits per OFDM symbol is selected such that the integer $N_{DBPS}$ constraint and the integer $N_{DBPS}/N_{ES}$ constraint are both satisfied for the system configuration being utilized. In another embodiment, the virtual number of coded bits per OFDM symbol is selected such that only the integer $N_{DBPS}$ constraint is satisfied, but the integer $N_{DBPS}/N_{ES}$ constraint is not necessarily satisfied. In one such embodiment, if the integer $N_{DBPS}/N_{ES}$ is not satisfied, then unequal bits distribution to multiple encoders is utilized (if more than one operating encoder). In one embodiment, the number of virtual coded bits per symbol is given by Equation 17. In another embodiment, the number of virtual coded bits per symbol is given by Equation 18. In another embodiment, a number of the virtual coded bits per symbol is determined in a different manner.

At block 1512, the padded information bits are parsed to a number of encoders. In one embodiment, each encoder is assigned an equal number of information bits. In another embodiment, information bits are distributed to the encoders unequally. For example, in one embodiment, bit distribution illustrated in FIG. 11 is utilized. In one such embodiment, information bits are parsed, at block 1406, according to the parsing technique illustrated in FIG. 12. In another embodiment, parsing technique illustrated in FIG. 13 is utilized. In another embodiment, a different bit distribution and/or a different parsing technique is utilized. At block 1516, information bits are encoded to generate coded bits. At block 1520, additional padding bits are added to each OFDM symbol so that a true number of coded bits is included in each symbol. At block 1524, the data unit is generated using the padded coded bits.

In some embodiments, in addition to, or instead of, utilizing a virtual number of coded bits per symbol when encoding a stream of information bits to generate a PHY data unit, one or more other virtual encoding parameters are utilized. For example, for certain system configurations, one or more of a virtual number of data bits per OFDM symbol (virtual $N_{DBPS}$) parameter, a virtual number of coded bits per OFDM symbol (virtual $N_{CBPS}$) parameter, a virtual number of data tones per OFDM symbol (virtual $N_{SD}$) parameter and/or another suitable virtual encoding parameter is utilized for some or all system configurations to ensure that the integer $N_{DBPS}$ constraint and/or the integer $N_{DBPS}/N_{ES}$ constraint are satisfied. In such embodiments, additional padding bits and/or padding symbols (e.g., constellation points) are added after information bits have been encoded, such that the number of padded coded bits (and/or symbols) corresponds to the number of coded bits and symbols that would result from the true value (or values) of the encoding parameter (or parameters). In such embodiments, encoding and parsing rules need not be altered to accommodate at least some system configurations that do not satisfy the integer constraints, because the integer constraints are "virtually" satisfied with the one or more virtual encoding parameters being utilized in the encoding process.

According to an embodiment, to accommodate at least some system configurations for which the integer $N_{DBPS}$ constraint and/or the integer $N_{DBPS}/N_{ES}$ constraint are not satisfied, a virtual number of data bits per OFDM symbol is utilized. In an embodiment, the virtual number of data bit per OFDM symbol is lower than the true number of data bits per symbol. For example, in an embodiment, the virtual number of data bits per OFDM symbol is determined according to:

$$N_{DBPS}{}^{virtual}=\lfloor N_{DBPS} \rfloor \qquad \text{Equation 19}$$

In another embodiment, another suitable integer number of virtual data bits per OFDM symbol is utilized. Encoding is performed based on the virtual number of data bits per OFDM symbol, in such embodiments. For example, a number of padding bits to be added to the information bits is determined based on the virtual number of data bits per OFDM symbol, in an embodiment. In an embodiment, the number of padding bits determined using the virtual number of data bits per OFDM symbol are added to information bits prior to encoding of the information bits. Then, after encoding of the information bits, additional padding bits are added to the coded bits such that the resulting number of coded bits per OFDM symbol corresponds to the true number of coded bits per OFDM symbol, in an embodiment.

In another embodiment, in addition to, or instead of, using a virtual number of data bits per OFDM symbol (and/or a virtual number of coded bits per OFDM symbol) to accommodate certain system configurations for which the integer $N_{DBPS}$ constraint and/or the integer $N_{DBPS}/N_{ES}$ constraint is not satisfied, a virtual number of data tones per OFDM symbol is utilized. The virtual number of data tones per OFDM symbol to be used for a particular system configuration is selected such that one or both of the integer $N_{DBPS}$ constraint and/or the integer $N_{DBPS}/N_{ES}$ constraints are satisfied for the particular system configuration, in an embodiment. In an embodiment, one or more data tones per OFDM symbol are designated as data tones that are not modulated with information, but rather are modulated with "padding" constellation points, such as random constellation points or constellation points of known (e.g., pre-determined) values. In such embodiments, encoding is performed based on the virtual number of data tones per OFDM symbol. After information bits are encoded based on the virtual number of data tones per OFDM symbol, the designated tones are modulated with "padding" constellation points.

In another embodiment, system configurations for which the integer $N_{DBPS}/N_{ES}$ constraint is not satisfied when the number of encoders is determined according to a first scheme are accommodated by determining the number of encoders according to a second scheme, wherein the second scheme ensures that the e integer $N_{DBPS}/N_{ES}$ constraint is satisfied for these system configurations. For example, in some system configurations, a number of encoders determined based on a maximum encoding rate of 600 Mbps results in a non-integer data bits per symbol per encoder for these system configurations, in some embodiments. In some such embodiments, for such system configurations, an additional encoder is utilized to ensure that the integer $N_{DBPS}/N_{ES}$ constraint is satisfied. For example, if five encoders are required to encode information bits for a certain system configuration and the five encoders result in a non-integer number of data bits per OFDM symbol per encoder ($N_{DBPS}/N_{ES}$), such as when using an MCS specifying 256 QAM modulation and a coding rate of ⅚ for six spatial streams in an 80 MHz BW (with 234 data tones), the number of encoders determined based on 600 Mbps coding rate is incremented by one or more encoders to ensure that the integer $N_{DBPS}/N_{ES}$ constraint is satisfied. For example, continuing with the same example, six encoders are instead utilized for this system configuration, in an embodiment. Alternatively, in another embodiment, the encoders support a higher encoding rate (e.g., a suitable encoding rate higher than 600 Mbps), allowing for the number of encoders to be decremented, rather than incremented, in some such system configurations. For example, in the example system configuration described above, fewer than five encoders (e.g., four encoders) are utilized to satisfy $N_{DBPS}/N_{ES}$ constraint, in an embodiment.

In yet another embodiment, the number of encoders for at least some system configurations in which the integer $N_{DBPS}/N_{ES}$ constraint is not satisfied with a certain maximum encoding rate (e.g., 600 Mbps), a different (e.g., higher) encoding rate is utilized to determine the number of encoders for these system configuration, such that the number of encoders determined according to the different encoding rate does not result in a violation of the integer $N_{DBPS}/N_{ES}$ constraint for these system configurations. For example, referring to FIG. 2, each encoder 212 supports a maximum encoding rate higher than 600 Mbps (e.g., 700 Mbps, 750 Mbps, 1200 Mbps, or another other suitable encoding rate higher than 600 Mbps), in some embodiments. In one such embodiment, system configurations for which the integer $N_{DBPS}/N_{ES}$ constraint is not satisfied when the number of encoders is determined based on the 600 Mbps maximum coding rate, a number of encoders is determined based another suitable coding rate that does not exceed the maximum coding rate, such that the number of encoders determined based on the higher coding rate does not result in a violation of the integer $N_{DBPS}/N_{ES}$ constraint.

Figure 16:
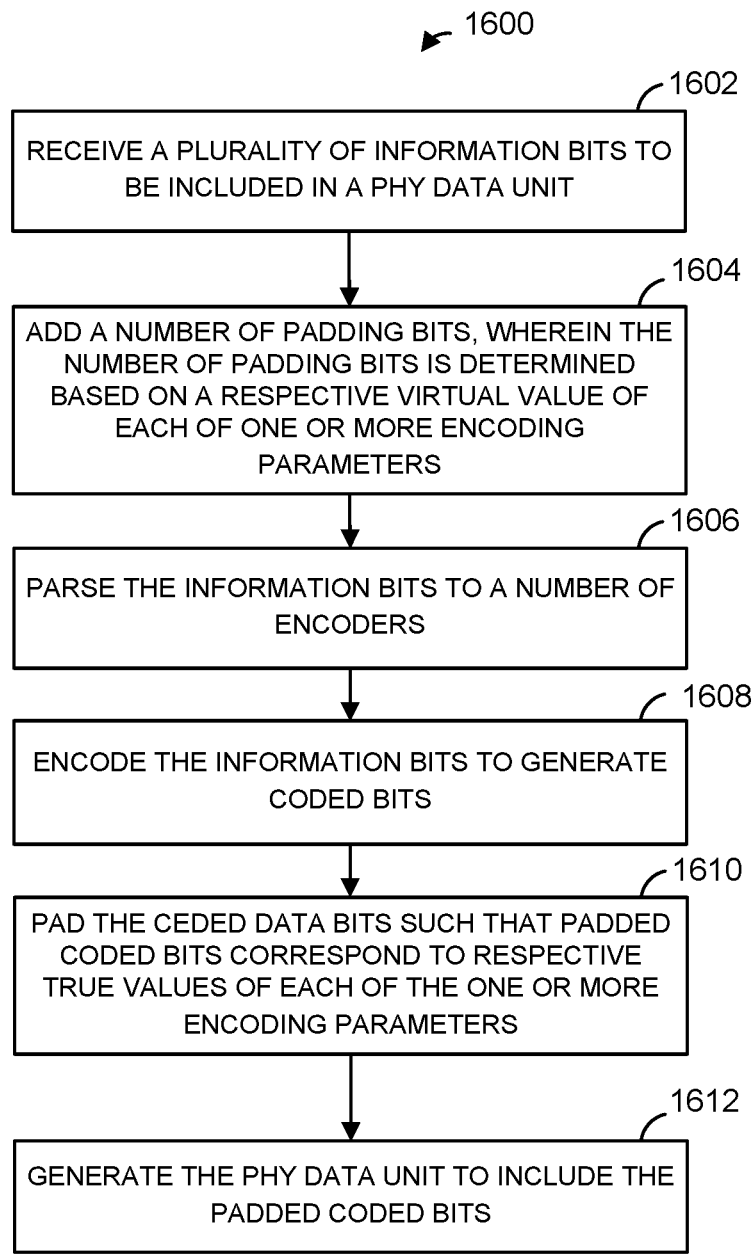
FIG. 16 is a flow diagram of another example method for generating a PHY data unit, according to yet another embodiment.

FIG. 16 is a flow diagram of an example method 1600 for generating a PHY data unit using a number of padding bits calculated based on respective virtual values of one or more encoding parameters, according to an embodiment. With reference to FIG. 1, the method 1600 is implemented by the network interface 16, in an embodiment. For example, in one such embodiment, the PHY processing unit 20 is configured to implement the method 1600. According to another embodiment, the MAC processing 18 is also configured to implement at least a part of the method 1600. With continued reference to FIG. 1, in yet another embodiment, the method 1600 is implemented by the network interface 27 (e.g., the PHY processing unit 29 and/or the MAC processing unit 28). In other embodiments, the method 1600 is implemented by other suitable network interfaces.

At block 1602, the network interface receives a plurality of information bits to be included in a PHY data unit. At block 1604, a number of padding bits is added to the information bits, wherein the number of padding bits is determined based on respective virtual values. In an embodiment, the respective virtual values of the one or more encoding parameters are selected such that the integer $N_{DBPS}$ constraint and the integer $N_{DBPS}/N_{ES}$ constraint are both satisfied for the system configuration being utilized. In another embodiment, the respective virtual values of the one or more encoding parameters are selected such that only the integer $N_{DBPS}$ constraint is satisfied, but the integer $N_{DBPS}/N_{ES}$ constraint is not necessarily satisfied. In one such embodiment, if the integer $N_{DBPS}/N_{ES}$ is not satisfied, then unequal bits distribution to multiple encoders is utilized (if more than one operating encoder). In another such embodiment, if the integer $N_{DBPS}/N_{ES}$ is not satisfied when the number of encoders is determined according to a first scheme (e.g., based on a particular encoding rate), then a different number of encoders is utilized for the system configuration, wherein the different number of encoders is determined according to a second scheme. In an embodiment, determining the number of encoders according to the second scheme comprises determining the number of encoders based on the same encoding rate as the encoding rate used in the first scheme, and incrementing or decrementing the determined number of encoders by one or more encoders (e.g., based on a different encoding rate, In one embodiment, the number of virtual coded bits per symbol is given by Equation 17. In another embodiment, the number of virtual coded bits per symbol is given by Equation 18. In another embodiment, a number of the virtual coded bits per symbol is determined in a different manner.

At block 1606, the padded information bits are parsed to a number of encoders. In one embodiment, each encoder is assigned an equal number of information bits. In another embodiment, information bits are distributed to the encoders unequally. For example, in one embodiment, bit distribution illustrated in FIG. 11 is utilized. In one such embodiment, information bits are parsed, at block 1606, according to the parsing technique illustrated in FIG. 12. In another embodiment, parsing technique illustrated in FIG. 13 is utilized. In another embodiment, a different bit distribution and/or a different parsing technique is utilized. In some embodiments, the number of encoders is determined based on the particular system configuration being utilized such that the padded information bits are parsed equally to the number of encoders in most or all system configurations.

At block 1608, information bits are encoded to generate coded bits. For example, the information bits are encoded using one or more BCC encoders (e.g., the encoders 212 utilizing BCC encoding), in an embodiment. In other embodiments, the information bits are encoded using other suitable encoding techniques. At block 1610, coded information bits are padded such that the coded information bits correspond to respective true values of each of the one or more encoding parameters. For example, in an embodiment in which the number of padding bits at block 1604 is determined based on a virtual number of data bits per OFDM symbol, the coded bits at block 1610 are padded such that the resulting number of padded coded bits per OFDM symbol corresponds to a true number of data bits per OFDM symbol (according to the encoding rate being utilized). As another example, in an embodiment in which the number of padding bits at block 1604 is determined based on a virtual number of coded bits per OFDM symbol, the coded bits at block 1610 are padded such that the resulting number of padded coded bits per OFDM symbol corresponds to a true number of coded bits per OFDM symbol. As yet another example, in an embodiment in which the number of padding bits at block 1604 is determined based on a virtual number of data tone per OFDM symbols, the data tones that were not included in the virtual number of data tones used to determine the number of padding bits at block 1508 are padded with padding constellation points at block 1610. At block 1612, the data unit is generated using the padded coded bits.

Figure 17:
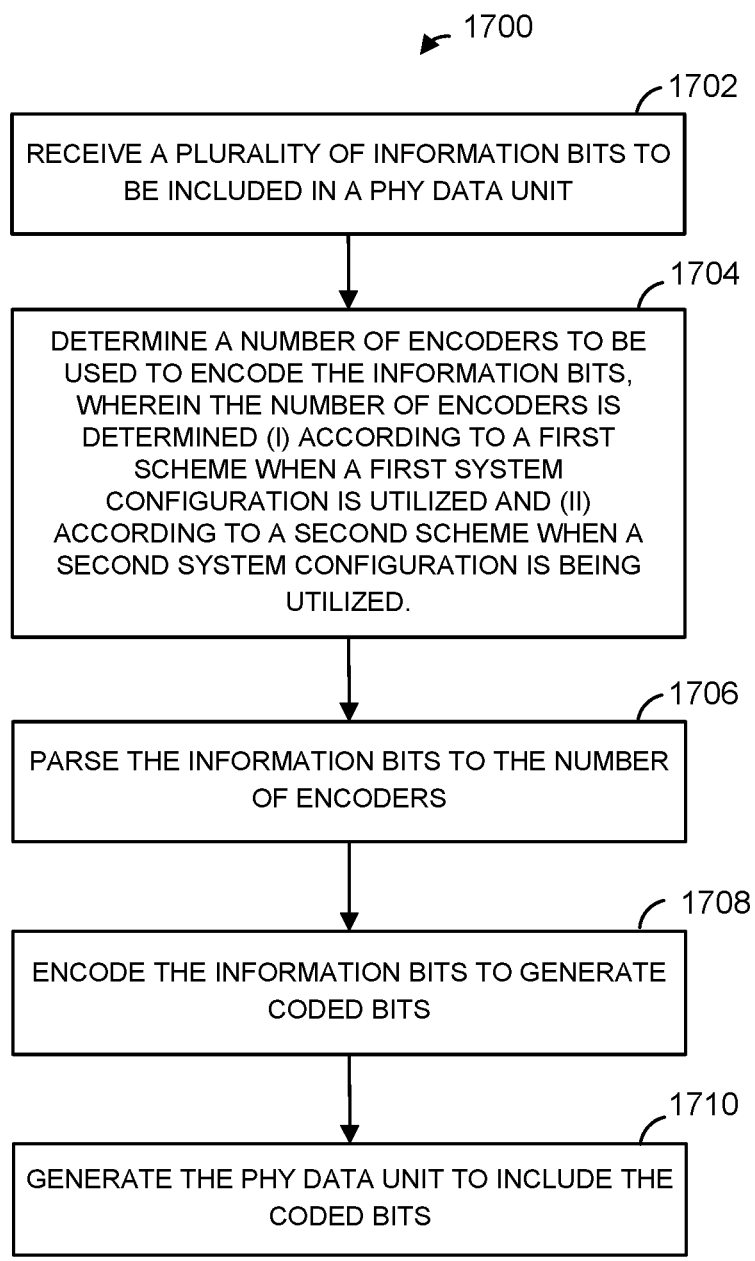
FIG. 17 is a flow diagram of another example method for generating a PHY data unit, according to still another embodiment.

FIG. 17 is a flow diagram of an example method 1700 for generating a PHY data unit using a number of padding bits calculated based on respective virtual values of one or more encoding parameters, according to an embodiment. With reference to FIG. 1, the method 1700 is implemented by the network interface 16, in an embodiment. For example, in one such embodiment, the PHY processing unit 20 is configured to implement the method 1700. According to another embodiment, the MAC processing 18 is also configured to implement at least a part of the method 1700. With continued reference to FIG. 1, in yet another embodiment, the method 1700 is implemented by the network interface 27 (e.g., the PHY processing unit 29 and/or the MAC processing unit 28). In other embodiments, the method 1700 is implemented by other suitable network interfaces.

At block 1702, the network interface receives a plurality of information bits to be included in a PHY data unit. At block 1704, a number of encoders to be used to encode the information bits received at block 1702 is determined. In an embodiment, determining the number of encoders at block 1704 is dependent on a particular system configuration (e.g., a particular MCS/bandwidth/number of spatial streams) being utilized. In particular, when a first system configuration is being utilized, the number of encoders is determined according to a first scheme and when a second system configuration is being utilized, the number of encoders is determined according to a second scheme. In an embodiment, the first system configuration corresponds to a system configuration in the integer $N_{DBPS}/N_{ES}$ constraint is satisfied when the number of encoders is determined according to the first scheme. On the other hand, in this embodiment, the second system configuration corresponds to a situation in which the integer $N_{DBPS}/N_{ES}$ constraint is not satisfied when the number of encoders is determined according to the first scheme. In this case, the second scheme ensures that the integer $N_{DBPS}/N_{ES}$ constraint is satisfied when the number of encoders is determined according to the second scheme, in an embodiment. For example, according to the second scheme, the number of encoders is determined using a different maximum encoding rate compared to the maximum encoding rate used to determine the number of encoders according to the first scheme. The maximum encoding rate used for determining the number of encoders according to the second scheme is selected such that the integer $N_{DBPS}/N_{ES}$ constraint is satisfied for the second system configuration, in an embodiment. In another embodiment, the number of encoders according to the second scheme is determined using the same maximum encoding rate as the maximum encoding rate used to determine the number of encoders according to the first scheme, but the determined number of encoders is incremented or decremented by one or more encoders such that the resulting number of encoders (determined according to the second scheme) does not result in a violation of the integer $N_{DBPS}/N_{ES}$ constraint.

At block 1706, the information bits received at block 1702 are parsed to the number of encoders determined at block 1704. At block 1708, the information bits are encoded using the number of encoders to generate a plurality of coded bits. At block 1710, the PHY data unit is generated to include the coded bits generated at block 1708.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed:

1. A method for generating a physical layer (PHY) data unit for transmission via a communication channel, the method comprising:
    receiving, at a communication device, a plurality of information bits to be included in the PHY data unit;
    determining, at the communication device, a virtual value of an encoding parameter corresponding to a number of bits per orthogonal frequency division multiplexing (OFDM) symbol, wherein the virtual value is less than a true value of the encoding parameter;
    prior to encoding the information bits, adding, at the communication device, a number of first padding bits to the information bits, wherein the number of first padding bits is determined using the virtual value of the encoding parameter;
    encoding, at the communication device, the information bits using one or more encoders to generate coded bits;
    after encoding the information bits, adding, at the communication device, second padding bits to the coded bits such that a number of coded bits in each of multiple OFDM symbols corresponds to the true value of the encoding parameter; and
    generating, at the communication device, the PHY data unit to include the coded bits.

2. The method of claim 1, wherein:
    determining the virtual value of the encoding parameter comprises determining a virtual value of a number of data bits per OFDM symbol parameter, wherein the virtual value is less than a true value of the number of data bits per OFDM symbol parameter; and
    the second padding bits are added to the coded bits such that the number of coded bits in each of the multiple OFDM symbols equals a number of coded bits per OFDM symbol parameter which corresponds to the true value of the number of data bits per OFDM symbol parameter.

3. The method of claim 1, wherein:
    determining the virtual value of the encoding parameter comprises determining a virtual value of a number of coded bits per OFDM symbol parameter, wherein the virtual value is less than a true value of the number of coded bits per OFDM symbol parameter; and
    the second padding bits are added to the coded bits such that the number of coded bits in each of the multiple OFDM symbols equals the number of coded bits per OFDM symbol parameter.

4. The method of claim 1, further comprising:
    determining, at the communication device, a number of encoders to use to encode the information bits, wherein the number of encoders for a particular system configuration is determined such that the number of encoders does not result in a non-integer number of data bits per encoder for each OFDM symbol of the PHY data unit.

5. The method of claim 4, further comprising:
    parsing, at the communication device, the information bits to the determined number of encoders.

6. The method of claim 1, wherein encoding the information bits includes encoding the information bits using one or more binary convolutional coding (BCC) encoders.

7. An apparatus, comprising:
    a network interface comprising one or more integrated circuit (IC) devices configured to:
        receive a plurality of information bits to be included in a physical layer (PHY) data unit for transmission via a communication channel,
        determine a virtual value of an encoding parameter corresponding to a number of bits per orthogonal frequency division multiplexing (OFDM) symbol, wherein the virtual value is less than a true value of the encoding parameter, and
        prior to encoding the information bits, add a number of first padding bits to the information bits, wherein the number of first padding bits is determined using the virtual value of the encoding parameter;
    wherein the network interface includes a set of encoders, implemented on the one or more IC devices, the set of encoders configured to encode the information bits to generate coded bits; and
    wherein the one or more IC devices are further configured to:
        after encoding the information bits, add second padding bits to the coded bits such that a number of coded bits in each of multiple OFDM symbols corresponds to the true value of the encoding parameter, and
        generate the PHY data unit to include the coded bits.

8. The apparatus of claim 7, wherein:
    the encoding parameter is a number of data bits per OFDM symbol parameter; and
    the one or more IC devices are configured to add the second padding bits to the coded bits such that the number of coded bits in each of the multiple OFDM symbols equals a number of coded bits per OFDM symbol parameter which corresponds to the true value of the number of data bits per OFDM symbol parameter.

9. The apparatus of claim 7, wherein:
    the encoding parameter is a number of coded bits per OFDM symbol parameter; and
    the one or more IC devices are configured to add the second padding bits to the coded bits such that the number of coded bits in each of the multiple OFDM symbols equals the number of coded bits per OFDM symbol parameter.

10. The apparatus of claim 7, wherein the one or more IC devices are further configured to:
    determine a number of encoders, in the set of encoders, to use to encode the information bits, wherein the number of encoders for a particular system configuration is determined such that the number of encoders does not result in a non-integer number of data bits per encoder for each OFDM symbol of the PHY data unit.

11. The apparatus of claim 10, wherein the network interface includes:
    a parser implemented on the one or more IC devices, the parser configured to parse the information bits to the determined number of encoders.

12. The apparatus of claim 7, wherein the set of encoders includes a set of binary convolutional coding (BCC) encoders.

13. The apparatus of claim 7, wherein the network interface includes;
    a PHY processing unit implemented on the one or more IC devices, wherein the PHY processing unit includes the set of encoders, and wherein the PHY processing unit is configured to:

after encoding the information bits, add the second padding bits to the coded bits, and
generate the PHY data unit to include the coded bits.

14. The apparatus of claim 13, wherein the PHY processing unit includes one or more transceivers.

15. The apparatus of claim 14, further comprising:
one or more antennas coupled to the one or more transceivers.

16. A method for generating a physical layer (PHY) data unit for transmission via a communication channel, the method comprising:
receiving, at a communication device, a plurality of information bits to be included in the PHY data unit;
determining, at the communication device, a number of encoders, from a set of encoders, to be used to encode the information bits, wherein the number of encoders is determined (i) according to a first scheme when a first system configuration is utilized and (ii) according to a second scheme when a second system configuration is utilized, wherein
 (i) when the first system configuration is utilized, the number of encoders is determined based on a first maximum encoding rate, and
 (ii) when the second configuration is utilized, the number of encoders is determined based on a second maximum encoding rate, wherein the second maximum encoding rate is greater than the first maximum encoding rate, such that the number of encoders does not result in a non-integer number of data bits per orthogonal frequency division multiplex (OFDM) symbol per encoder;
parsing, at the communication device, the information bits to the determined number of encoders;
encoding, at the communication device, the information bits using the determined number of encoders to generate coded bits; and
generating, at the communication device, the PHY data unit to include the coded bits.

17. The method of claim 16, wherein the set of includes a set of binary convolutional coding (BCC) encoders.

18. An apparatus, comprising:
a network interface comprising one or more integrated circuit (IC) devices;
wherein the network interface includes: i) a parser implemented on the one or more IC devices, and ii) a set of encoders implemented on the one or more IC devices; and
wherein the one or more IC devices are configured to:
receive a plurality of information bits to be included in a physical layer (PHY) data unit for transmission via a communication channel,
determine a number of encoders, from the set of encoders, to be used to encode the information bits, wherein the number of encoders is determined (i) according to a first scheme when a first system configuration is utilized and (ii) according to a second scheme when a second system configuration is utilized, wherein
 (i) when the first system configuration is utilized, the number of encoders is determined based on a first maximum encoding rate, and
 (ii) when the second configuration is utilized, the number of encoders is determined based on a second maximum encoding rate, wherein the second maximum encoding rate is greater than the first maximum encoding rate, such that the number of encoders does not result in a non-integer number of data bits per orthogonal frequency division multiplex (OFDM) symbol per encoder;
wherein the one or more IC devices are further configured to:
parse, with the parser, the information bits to the determined number of encoders in the set of encoders,
encode the information bits using the determined number of encoders to generate coded bits, and
generate the PHY data unit to include the coded bits.

19. The apparatus of claim 18, wherein the set of the encoders includes a set of binary convolutional coding (BCC) encoders.

20. The apparatus of claim 18, wherein the network interface includes;
a PHY processing unit implemented on the one or more IC devices, wherein the PHY processing unit includes i) the set of encoders, and ii) the parser, and wherein the PHY processing unit is configured to generate the PHY data unit to include the coded bits.

21. The apparatus of claim 20, wherein the PHY processing unit includes one or more transceivers.

22. The apparatus of claim 21, further comprising:
one or more antennas coupled to the one or more transceivers.

* * * * *